No. 741,304.

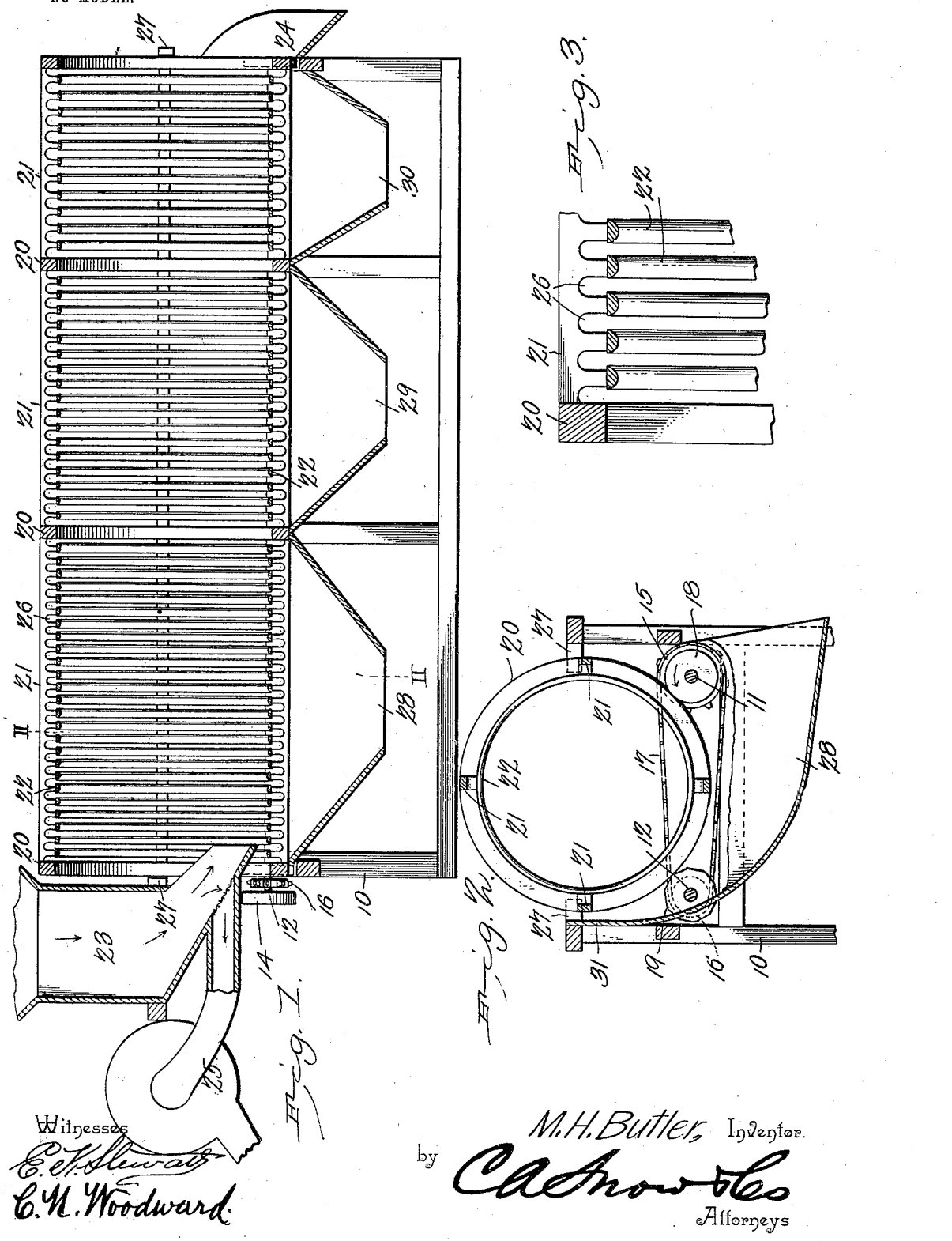

Patented October 13, 1903.

UNITED STATES PATENT OFFICE.

MILTON H. BUTLER, OF CHERRYCREEK, NEW YORK.

STRING-BEAN GRADER.

SPECIFICATION forming part of Letters Patent No. 741,304, dated October 13, 1903.

Application filed November 1, 1902. Serial No. 129,722. (No model.)

*To all whom it may concern:*

Be it known that I, MILTON H. BUTLER, a citizen of the United States, residing at Cherrycreek, in the county of Chautauqua and State of New York, have invented a new and useful String-Bean Grader, of which the following is a specification.

This invention relates to that class of apparatus employed for grading and separating different kinds of farm and garden products, more particularly for separating and grading string-beans and similar-shaped products, and will be employed more particularly for preparing products for canning establishments, but which may be employed in other localities and for other purposes, and it is not desired that the use of the device shall be limited for any specific purpose or for separating or grading any specific product or material, and the right is therefore reserved for the use of the device for any purpose to which it is adapted.

One object of the invention is to produce a simply-constructed and easily-operated apparatus whereby the different sizes of the material fed thereto will be automatically separated and graded as to size and deposited in separate receptacles.

Another object of the invention is to produce a device wherein the material fed to the apparatus will be separated and graded as to size and deposited in separate receptacles and the refuse material carried through the machine and separately discharged therefrom.

Other novel features of the invention will appear in the annexed description and be specified in the claims following.

In the drawings illustrative of the invention, Figure 1 is a longitudinal sectional elevation of the apparatus complete. Fig. 2 is a transverse section on the line II II of Fig. 1. Fig. 3 is an enlarged sectional detail of a portion of the cylinder, illustrating its construction.

The improved device consists of a supporting-framework of any suitable construction and upon which are journaled two spaced shafts, the framework being indicated at 10 and the shafts at 11 12. The shafts will be suitably mounted by bearings upon the framework, and one of them will be provided with a driving-pulley 14, and each will be provided likewise with a sprocket-wheel 15 16, connected by chain 17, so that motion imparted to the drive-pulley 14 and shaft 11 will be transmitted to the shaft 12 and both revolved from one source of power.

Mounted upon the shaft 11 are a series of smooth-surfaced pulleys 18, the pulleys located at the ends of the machine and at intermediate points, as indicated in Fig. 1, and similarly mounted upon the shaft 12 in transverse alinement with the pulleys 18 are other pulleys 19, the latter having irregular peripheries, as shown in Fig. 2. Resting upon these pulleys is a separating-cylinder adapted to grade the material and will be formed in sections longitudinally, each section adapted to separate the material into a different grade. Any desired number of the sections may be employed; but for the purpose of illustration three of these sections are shown, and the pulleys 18 19 will be located at the dividing-lines between the sections. The cylinder is constructed of a plurality of annular bands 20 in engagement with the pulleys 18 19, as shown, and connected by longitudinal spaced ribs 21, the whole forming an open framework without interior obstruction and resting in engagement with the pulleys, as indicated. Connected to the longitudinal ribs 21 are a plurality of spaced annular slats 22 semicircular in cross-section, with the rounded surfaces extended inwardly, as indicated. Each of the sections will be provided with the slats 22, with the interstices between the slats at the feed end narrower than those at the discharge end and the interstices between the intermediate sections graduated between these two, so that the interstices between the slats increase in width consecutively from the feed-end section to the discharge-end section, as shown in Fig. 1.

The feed-hopper is represented at 23 and the discharge-spout at 24, a suction-fan, indicated at 25, being located at the feed end and adapted to remove the lighter particles of foreign matter from the material before it passes to the cylinder.

Any approved form of fan may be employed and located at any desired point relative to the cylinder; but for the purpose of illustration a conventional form of fan-casing is shown, but is not further illustrated, as the forms of these devices and their mode of operation are so well known.

Formed in the inner sides of the longitudinal ribs 21 are transverse cavities 26, spaced apart and located opposite the interstices between the slats 22, as shown, the cavities being preferably formed a little wider than the respective interstices opposite which they come, as indicated more clearly in Fig. 3. By this means it will be noted that the edges of the slats where they engage the ribs 21 project somewhat to provide for the free escape of the material, as hereinafter more fully described.

The supporting-framework 10 will be provided with projecting stops 27 at the ends to prevent longitudinal movement of the cylinder in either direction, the stops serving to retain the cylinder in position longitudinally relative to the framework, while at the same time permitting it to be rotated by the action of the pulleys 18, the latter serving as friction drive-pinions, operating against the annular bands 20, as will be obvious.

Under the spaced sections of the cylinder are independent hoppers 28 29 30, as shown in Fig. 1, so that the product of each section will be separately conducted from the machine.

The interstices between the slats 22 will be regulated to adapt the device to the material to be separated or graded and may be varied as required and may be employed, as before stated, for separating various products or material, but is more particularly adapted to the separation and grading of string-beans and similar-shaped products, and when employed for this class of material the latter will be fed through the hopper 27 to the cylinder, which is being revolved by engagement with the pulleys 18, while the pulleys 19 by their irregular surface impart to the cylinder a slight agitation, as one side of the cylinder is caused to rise and fall against the irregular surfaces of the pulleys.

The shaft 11 will be revolved in the direction of the arrow shown in Fig. 2, which will cause the cylinder to be revolved in the same direction and will carry the material around with it, this action causing the long beanpods to assume a position in alinement with the slats, and by reason of the rounded form of the slats the latter will cause the beans to engage the interstices between the slats, and the smaller beans will fall through and be discharged from the hopper 28, while the larger beans will pass to the next section and the next size separated therein in the same manner and fall into the discharge-hopper 29, while the next grade will be correspondingly separated in the third section and discharged from the hopper 30, while the "tailings" will pass off over the chute 24. As the cylinder revolves it is rapidly agitated transversely by the pulleys 19, which action shakes the beans loose and prevents them from sticking in the interstices, and thus effectually prevents any clogging of the machine. This is a very important feature of the invention, as it very effectually prevents the clogging of the machine and keeps the product in constant motion and insures a more rapid and complete separation into the various sizes and causes the product to be carried through the cylinder from the feed toward the discharge end.

Another important feature of the invention are the cavities 26 in the bars 21 made wider than the interstices opposite which they come, as they afford means for the passage of any of the beans which happen to fall transversely of the ribs, and by forming the cavities wider than the interstices the beans will not lodge in the cavities, but will freely fall therefrom. By this simple means the presence of the ribs does not interfere with the action of the device and offers no obstruction thereto.

It will be noted that the interior of the cylinder is entirely unobstructed, so that the product will not be retarded in its passage therethrough.

The induced air-currents caused by the fan member 25 is also an important feature of the invention, as it greatly aids in the separation by removing the lighter particles of dust, chaff, and leaves, and similar foreign matter and preventing them from mingling with the valuable portions of the product.

The cylinder may be constructed of any desired size either transversely or longitudinally and divided into as many sections as desired, with the annular slats spaced apart to any required extent to adapt the device to the material to be separated.

The sprocket-wheel 16, it will be noted by reference to Fig. 2, is smaller than the sprocket-wheel 15, so that the shaft 12, with its irregular-surfaced wheels 19, will revolve faster than the shaft 11, with its smooth-surfaced wheels 18, so that the velocity of the agitation is thereby increased and the effectiveness correspondingly increased.

The relative sizes of the pulleys 18 19 may be increased or decreased, as required, to increase or decrease the rotative speed of the cylinder or to increase or decrease the degree of the agitation.

The pulleys 19 may be provided with any desired number of the tangential surfaces and may be revolved at any desired speed relative to the rotative speed of the cylinder.

Any desired number of the longitudinal ribs 21 may be employed; but generally four will be sufficient, as shown.

The receiving pockets or hoppers 28 29 30 will be extended upward on the rear side, as shown at 31, to insure the reception of all the material which falls through the slats into their respective receptacles and preventing any of it being carried over when carried upward upon the rising side of the cylinder.

This makes a very complete simply operated and constructed device which very effectually separates and grades string-beans and similar-shaped products and delivers each grade into a separate receptacle and will be found a very useful and valuable adjunct to canning factories and in other localities wherein products require to be graded and separated.

The slats 22 may be formed of hoops circular in cross-section instead of the semicircular bars illustrated; but this would not be a departure from the principle of the invention, as the results produced would be precisely the same.

The annular bands 20 may be formed of metal, wood, or other similar material, as preferred, and other parts may be either wood or metal or parts of wood and parts of metal, as may be preferred.

Having thus described the invention, what is claimed is—

1. In a device of the class described, the combination with supporting and guiding pulleys, of a cylinder comprising a plurality of spaced annular bands resting on said pulleys, longitudinal ribs connecting the bands, a plurality of spaced slats arranged between the bands and divided by the bands into a number of differently-spaced sections, the bands having their inner surfaces curved for contact with the material to be separated, and the ribs being provided with recesses or notches opposite each interstice, the width of said recesses or notches being greater than the distance between adjacent bands, substantially as specified.

2. In a device of the character described, a cylinder formed of spaced slats disposed transversely to the axial line and rotatively mounted at one side in engagement with revolving pulleys and supported at the other side upon revolving cam-pulleys, whereby a combined revolving and agitating movement is imparted to the cylinder, substantially as described.

3. In a device of the character described, a cylinder formed of a plurality of annular bands spaced apart and connected by longitudinal ribs and spaced annular slats connecting said ribs between said bands, friction-pulleys rotatively engaging said bands upon one side of said cylinder, pulleys having irregular surfaces engaging said bands from the opposite side of said cylinder, and means for rotating said pulleys, whereby said cylinder is simultaneously rotated and agitated, substantially as described.

4. In a device of the character described, a cylinder formed of spaced annular slats disposed transversely to the axial line and supported upon one side by friction-pulleys and upon the other side by pulleys having irregular surfaces, and means for rotating said pulleys at differential speeds, whereby said cylinder is simultaneously rotated and agitated, substantially as described.

5. In a device of the character described, a supporting-framework, spaced shafts rotatively supported upon said framework, friction-pulleys upon one of said shafts, irregular-surfaced pulleys upon the other of said shafts, and a cylinder formed of spaced annular slats disposed transversely to the axial line and rotatively mounted upon said pulleys, substantially as described.

In testimony that I claim the foregoing as my own I have hereto affixed my signature in the presence of two witnesses.

MILTON H. BUTLER.

Witnesses:
R. C. BULLOCK,
G. E. DeLANEY.